United States Patent
Reynolds et al.

(10) Patent No.: US 9,932,985 B2
(45) Date of Patent: Apr. 3, 2018

(54) GAS TURBINE ENGINE COMPRESSORS HAVING OPTIMIZED STALL ENHANCEMENT FEATURE CONFIGURATIONS AND METHODS FOR THE PRODUCTION THEREOF

(71) Applicant: HONEYWELL INTERNATIONAL INC., Morristown, NJ (US)

(72) Inventors: Bruce David Reynolds, Chandler, AZ (US); Nick Nolcheff, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 433 days.

(21) Appl. No.: 14/612,404

(22) Filed: Feb. 3, 2015

(65) Prior Publication Data
US 2016/0222973 A1 Aug. 4, 2016

(51) Int. Cl.
*F04D 27/02* (2006.01)
*F04D 19/02* (2006.01)
(Continued)

(52) U.S. Cl.
CPC .............. *F04D 27/02* (2013.01); *F01D 25/24* (2013.01); *F04D 19/02* (2013.01); *F04D 27/001* (2013.01);
(Continued)

(58) Field of Classification Search
CPC ...... F04D 27/02; F04D 29/685; F04D 27/001; F04D 29/526; F04D 19/02; F04D 29/321;
(Continued)

(56) References Cited

U.S. PATENT DOCUMENTS 4,189,939 A * 2/1980 West .................... F01D 21/003
73/116.03
7,011,490 B2 3/2006 Albrecht et al.
(Continued)

FOREIGN PATENT DOCUMENTS

EP 2728196 A2 5/2014
GB 2158879 A 11/1985

OTHER PUBLICATIONS

EP Extended Search Report for Application No. 16153522.4-1607 dated Jul. 1, 2016.
(Continued)

*Primary Examiner* — Michael R Reid
(74) *Attorney, Agent, or Firm* — Lorenz & Kopf, LLP (57) ABSTRACT

Multistage gas turbine engine (GTE) compressors having optimized stall enhancement feature (SEF) configurations are provided, as are methods for the production thereof. The multistage GTE compressor includes a series of axial compressor stages each containing a rotor mounted to a shaft of a gas turbine engine. In one embodiment, the method includes the steps or processes of selecting a plurality of engine speeds distributed across an operational speed range of the gas turbine engine, identifying one or more stall limiting rotors at each of the selected engine speeds, establishing an SEF configuration in which SEFs are integrated into the multistage GTE compressor at selected locations corresponding to the stall limiting rotors, and producing the multistage GTE compressor in accordance with the optimized SEF configuration.

15 Claims, 4 Drawing Sheets

(51) Int. Cl.
F04D 29/32 (2006.01)
F01D 25/24 (2006.01)
F04D 27/00 (2006.01)
F04D 29/52 (2006.01)
F04D 29/68 (2006.01)

(52) U.S. Cl.
CPC ......... F04D 29/321 (2013.01); F04D 29/526 (2013.01); F04D 29/685 (2013.01); F04D 27/0261 (2013.01); F05D 2220/32 (2013.01); F05D 2230/00 (2013.01)

(58) Field of Classification Search
CPC .. F04D 27/0261; F04D 27/004; F04D 27/009; F04D 27/0238; F04D 29/684; F05D 2270/101; F05D 2230/00; F05D 2220/32; F01D 25/24
USPC .................. 415/1, 116, 173.1, 914
See application file for complete search history.

(56) References Cited

U.S. PATENT DOCUMENTS

| 8,066,471 | B2 | 11/2011 | Bayere et al. |
| 8,550,768 | B2 | 10/2013 | Montgomery |
| 2009/0169362 | A1 | 7/2009 | Wadia et al. |
| 2011/0299979 | A1* | 12/2011 | Montgomery .......... F01D 5/143 415/182.1 |

OTHER PUBLICATIONS

Cornelius, Christian, et al., "Experimental and Computational Analysis of a Multistage Axial Compressor Including Stall Prediction by Steady and Transient CFD Methods," Journal of Turbomachinery, Jun. 1, 2014, [age 61013, XP055283467, Retrieved from URL:http://turbomachinery.asmedigitalcollection.asme.org/data/Journals/JOTUEI/928800/turbo_136_06_061013.pdf?resultClick=3 [retrieved on Jun. 24, 2016].

Wilke, I. et al.; A Numerical Investigation of the Influence of Casing Treatments on the Tip Leakage Flow in a HPC Front Stage; Proceedings of ASME Turbo Expo 2002—Jun. 3-6, 2002, Amsterdam, The Netherlands; GT-2002-30642.

Gourdain, N. et al.; Effect of Tip Clearance Dimensions and Control of Unsteady Flows in a Multi-Stage High-Pressure Compressor; Journal of Turbomachinery Copyright 2012 by ASME Sep. 2012, vol. 134 / 051005-1.

Marty, J. et al.; Numerical and Experimental Investigations of Flow Control in Axial Compressors; Issue 6—Jun. 2013—Numerical and Experimental Investigations of Flow Control in Axial Compressors, AL06-09; Journal Aerospace Lab.

* cited by examiner

GAS TURBINE ENGINE COMPRESSORS HAVING OPTIMIZED STALL ENHANCEMENT FEATURE CONFIGURATIONS AND METHODS FOR THE PRODUCTION THEREOF

TECHNICAL FIELD

The present invention relates generally to gas turbine engines and, more particularly, to gas turbine engine compressors having optimized stall enhancement feature configurations and to methods for the production thereof.

BACKGROUND

The compressor section of a Gas Turbine Engine (GTE) often includes multiple axial compressor stages positioned in succession. Each axial compressor stage typically contains a rotor disposed immediately upstream of a stator. The compressor rotors are essentially bladed wheels, which are surrounded by a tubular casing or shroud. Each compressor rotor may be mounted to a shaft of the GTE. During operation, the compressor rotors rotate along with the shaft to compress airflow received from the GTE's intake section. The final axial compressor stage discharges the hot, compressed air, which can be supplied directly to the engine's combustion section for mixture with fuel and subsequent ignition of the fuel-air mixture. Alternatively, the airflow discharged by the final axial compressor stage can be fed into a centrifugal or radial compressor stage, which further compresses and heats the airflow prior to delivery to the engine's combustion section.

As compressor pressure ratios improve, so too does overall GTE performance potential. Several different approaches have traditionally been employed to improve compressor pressure ratios. These traditional approaches include increasing the compressor stage count, increasing the aerodynamic loading of the compressor, and increasing the rotational speed range over which the compressor section operations. Each of the foregoing approaches is, however, associated with a corresponding tradeoff or penalty. For example, increasing the number of compressor stages adds undesired length, weight, and cost to the GTE. Additionally, increasing the number of compressor stages can degrade performance matching for off-design GTE operation. Increasing the aerodynamic loading of the compressor often negatively impacts compressor stall margin. Finally, increasing the rotational speed range over which the GTE operates typically reduces compressor efficiency and can shorten the operational lifespan of the engine components.

BRIEF SUMMARY

Methods for producing multistage gas turbine engine (GTE) compressors having optimized stall enhancement feature (SEF) configurations are provided. The multistage GTE compressor includes a series of axial compressor stages each containing a rotor mounted to a shaft of a gas turbine engine. In one embodiment, the method includes the steps or processes of selecting a plurality of engine speeds distributed across an operational speed range of the gas turbine engine, identifying one or more stall limiting rotors at each of the selected engine speeds, and establishing an optimized SEF configuration in which SEFs are integrated into the multistage GTE compressor at selected locations corresponding to the stall limiting rotors. The multistage GTE compressor is then produced in accordance with the optimized SEF configuration. In certain cases, the optimized SEF configuration can be established to include a first type of stall enhancing feature disposed at a location corresponding to a first stall limiting rotor and to include a second, different type of stall enhancing feature disposed at location corresponding to a second stall limiting rotor. In such embodiments, the first type of stall enhancing feature may be casing treatment features disposed at a location circumscribing the leading rotor.

In another embodiment wherein the series of axial compressor stages contains a total number of rotors equal to $n_{total}$, the method includes the step or process of producing the multistage GTE compressor to include SEFs applied at selected locations corresponding to a subset of rotors equal to $n_{enhanced}$. The multistage GTE compressor is further produced such that $2 \leq n_{enhanced} < n_{total}$. Additionally, the SEFs are applied to at least one forward compressor stage and to at least one aft compressor stage of the multistage GTE compressor.

Multistage GTE compressors having optimally-positioned stall enhancement features are further provided. In one embodiment, the multistage GTE compressor includes an engine casing, a shaft mounted in the engine casing for rotation about a rotational axis, and a series of axial compressor stages each containing a rotor mounted to the shaft and surrounded by the engine casing. A plurality of SEFs is integrated into the series of axial compressor stages at locations corresponding to a selected subset of rotors. The total number of rotors included within the series of axial compressor stages is equal to $n_{total}$, while the number of rotors included within the selected subset of rotors is equal to $n_{enhanced}$ such that $2 \leq n_{enhanced} < n_{total}$.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes embodiments of a method for improving the performance of a multistage GTE compressor through the selective application of stall enhancing features (SEFs) to the compressor. As appearing herein, the term "stall enhancing features" and its corresponding acronym "SEFs" refer generally to any structural feature or device suitable for usage within a multistage GTE compressor to increase the stall margin of a compressor rotor, such as an axial compressor rotor. Stall enhancing features that are formed in or otherwise integrated into the engine casing at a location surrounding a rotor (and, perhaps, extending for some distance beyond the rotor in a forward and/or an aft direction) are referred to herein as "casing treatment features." A non-exhaustive list of casing treatment features includes grooves or channels formed in the interior of the engine casing or rotor shroud, honeycomb structures, recirculating treatments, suction devices, blowing devices, active clearance control devices, and plasma flow control devices. Stall enhancing features that inject pressurized airflow upstream of a rotor (specifically, in the rotor's upstream flow field) are referred to herein as "upstream injection features." Upstream injection features include, but are not limited to, stator hub flow injection features, which direct pressurized airflow into the main flow path at a location proximate the hub of the stator immediately upstream of the rotor targeted for stall margin increase.

The term "selective application" is utilized herein to indicate that SEFs are not applied globally across the multistage GTE compressor, but rather integrated into the compressor at a limited number of locations corresponding to certain "stall limiting" rotors. In this regard, the present inventors have determined that the global application of SEFs across all compressor stages of a multistage GTE compressor can result in a performance penalty for a subset of the compressor stages, especially when the multistage GTE compressor includes a relatively high number of axial compressor stages. Additionally, the global application of SEFs across all compressor stages of a multistage GTE compressor can add undesired cost and complexity to the manufacturing process utilized to produce the compressor. At the same time, the potential increase in compressor pressure ratios may not be fully realized by the exclusive application of SEFs to a single stage (e.g., the first compressor stage) or rotor of a multistage GTE compressor. Consequently, there exists an ongoing need to provide methods for optimizing compressor performance through the selective application of SEFs to a multistage GTE compressor. Embodiments of such a method are described herein.

Figure 1:
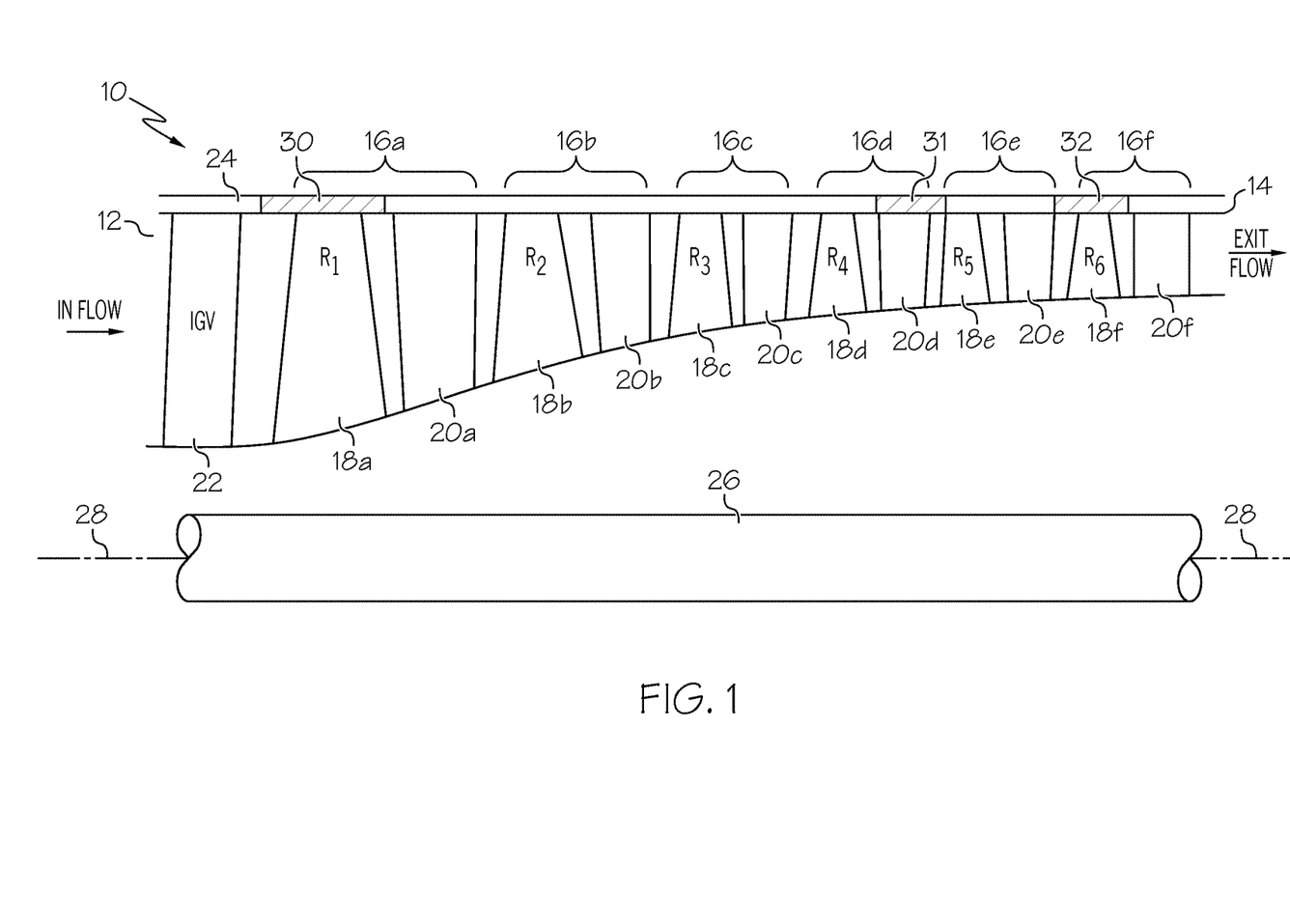
FIG. 1 is a cross-sectional schematic of a multistage Gas Turbine Engine (GTE) compressor having an optimized stall enhancing feature (SEF) configuration and produced in accordance with an exemplary embodiment of the present invention.

For the purposes of explanation, the following will describe embodiments of the method for optimizing compressor performance in conjunction an exemplary multistage GTE compressor 10, as schematically illustrated in FIG. 1. The following description notwithstanding, it is emphasized that multistage GTE compressor 10 is shown by way of non-limiting example only and that embodiments the compressor optimization method can be carried-out for any multistage GTE compressor having at least two axial compressor stages. As can be seen in FIG. 1, multistage GTE compressor 10 includes an inlet 12, an outlet 14, and a number of axial compressor stages 16, which are positioned in flow series between inlet 12 and outlet 14. Each compressor stage 16 includes an axial compressor rotor 18 followed by a compressor stator 20. In the illustrated example, multistage GTE compressor 10 includes a total of six compressor stages 16, which are identified as stages 16(a)-16(f). The compressor rotors and stators are also individually labeled in keeping with this convention such that the rotor and stator included in compressor stage 16(a) are identified by reference numerals "18(a)" and "20(a)," respectively; the rotor and stator included in compressor stage 16(b) are identified by reference numerals "18(b)" and "20(b)," respectively; the rotor and stator included in compressor stage 16(c) are identified by reference numerals "18(c)" and "20(c)," respectively; and so on. Additionally, an Inlet Guide Vane (IGV) assembly 22 is further positioned immediately upstream of the first axial compressor stage 16(a).

Compressor stages 16 are surrounded by a shroud or engine casing 24. It will be appreciated that, as are the other components of multistage GTE compressor 10, engine casing 24 is generally axisymmetric about the centerline or rotational axis 28 of the gas turbine engine. Engine casing 24 thus has a generally tubular or annular shape when viewed in three dimensions. Engine casing 24 and the other non-illustrated components of multistage GTE compressor 10 are included in the static infrastructure of the GTE core. Compressor stators 20 are bolted or otherwise fixedly attached the static engine infrastructure such that stators 20 do not rotate during engine operation. In contrast, compressor rotors 18 are fixedly mounted to a shaft 26 (e.g., utilizing friction drive or curvic-type couplings) and rotate in conjunction therewith about rotational axis 28. Although not visible in the illustrated schematic, the blade tips of each compressor rotor 18 are separated from the inner circumferential surface of engine casing 24 by a small annular clearance or gap. Furthermore, although only a single shaft 26 is shown in FIG. 1, it will be appreciated that the engine containing multistage GTE compressor 10 can include any practical number of shafts in further embodiments. Finally, while shown to include only axial compressor stages in the illustrated example, compressor 10 include an additional radial or centrifugal compressor stage downstream of the final axial compressor stage 16(f) in further embodiments. In this case, the centrifugal compressor stage may also be evaluated utilizing the process or method described below and also considered for the potential application of stall enhancing features. Specifically, in such embodiments, it can be determined whether the impeller contained in the centrifugal compressor stage is a "stall limiting rotor" of the type defined below and, if the impeller is so identified, stall enhancing features can be applied around or immediately upstream of the impeller to improve its stall margin at one or more selected engine speeds, as described below.

In accordance with embodiments of the present invention, SEFs are applied to or integrated into multistage GTE compressor 10 at selected locations corresponding to a number of stall limiting rotors. Rotor are identified herein as "stall limiting" when, absent the stall-boosting effect of the below-described SEFs, the rotor sets stall of compressor 10 at an undesirably low level for at least one engine speed. In the exemplary embodiment shown in FIG. 3, multistage GTE compressor 10 includes three such stall limiting rotors: (i) rotor 18(a) contained in the first axial compressor stage 16(a), (ii) rotor 18(e) contained in the fifth axial compressor stage 16(e), and (iii) rotor 18(f) contained within the sixth and final axial compressor stage 16(f). As will be described more fully below, SEFs are integrated into multistage GTE compressor 10 at selected locations corresponding to stall limiting rotors 18(a), 18(e), and 18(f). In the exemplary embodiment shown in FIG. 1, these locations are generically represented by cross-hatched regions 30, 31, and 32 corresponding to rotors 18(a), 18(e), and 18(f), respectively.

A given SEF (or group of SEFs) is considered to be positioned at a location "corresponding to" a stall limiting rotor when the SEF is positioned to have a direct boosting effecting on the stall margin of the targeted rotor. The relative positioning between a given SEF and its corresponding stall limiting rotor will vary in conjunction with SEF type. For example, in an embodiment wherein one or more of the SEFs assume the form of casing treatment features, the casing treatment features will typically be integrated into the engine casing at locations surrounding one or more stall limiting rotors and, perhaps, extending beyond each stall limiting rotor by some amount in a forward and/or aftward direction. With continued reference to FIG. 1, cross-hatched regions 30 and 32 may be considered to represent casing treatment features formed in engine casing 24 at a locations surrounding or circumscribing stall limiting rotors 18(a) and 18(f), respectively. In contrast, in an embodiment wherein one or more of the SEFs assume the form of upstream injection features, the upstream injection features can be disposed at any location upstream or forward of the stall limiting rotor, while remaining within the rotor's flow field. An example of this is shown in FIG. 1 at cross-hatched region 31, which represents upstream injection features disposed forward of stall limiting rotor 18(e).

Multistage GTE compressor 10 can be described as containing three forward compressor stages 16(a)-(c) and three aft compressor stages 16(d)-(f). As appearing herein, the term "forward compressor stage(s)" refers to the compressor stage(s) upstream of the median compressor stage when the compressor includes an odd number of compressor stages or upstream of a plane (orthogonal to rotational axis 28) having an equal number of compressor stages on its opposing sides when the compressor contains an even number of compressor stages. Conversely, the term "aft compressor stage(s)" refers to the compressor stage(s) downstream of the median compressor stage when the compressor includes an odd number of compressor stages or downstream of a plane having an equal number of compressor stages on its opposing sides when the compressor includes an even number of compressor stages. The number of rotors identified as "stall limiting" and targeted by the selective application of SEFs will vary amongst embodiments. However, in many embodiments, the compressor will include at least one forward compressor stage and at least one aft compressor stage to which SEFs are applied in accordance with the method described below. In further embodiments, SEFs can be added to fewer or greater number of compressor stages, providing that SEFs are applied to at least two axial compressor stages included within the multistage GTE compressor, but less than the total number of axial compressor stages included therein. In such embodiments, the following equation may pertain: $2 \leq n_{enhanced} < n_{total}$, wherein $n_{total}$ is the total number of rotors included within the axial compressor stages, and wherein the SEFs are applied at selected locations corresponding to $n_{enhanced}$ number of the rotors.

Figure 2:
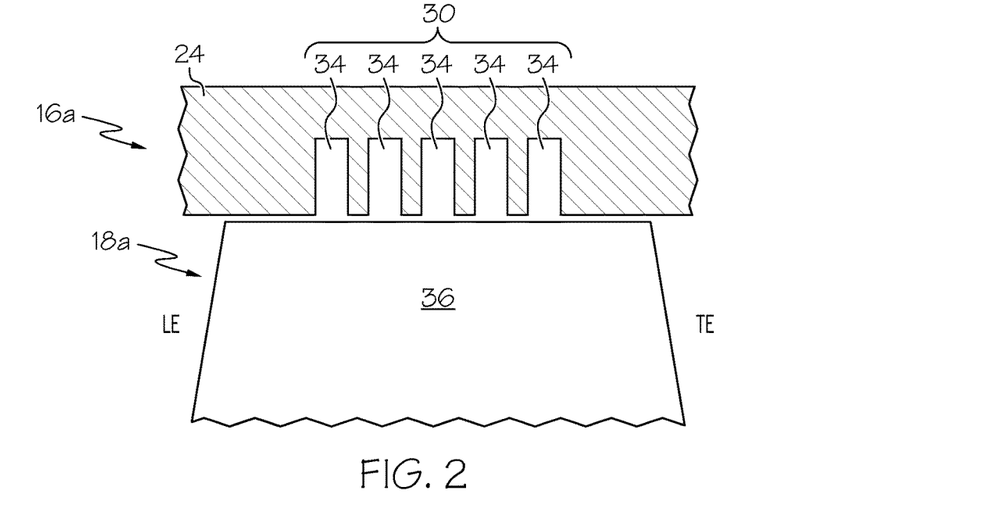
FIG. 2 is a detailed cross-sectional view of a first region of the multistage GTE compressor shown in FIG. 1 at which SEFs in the form of casing treatment features have been selectively applied.

FIG. 2 illustrates region 30 of compressor 10 in an embodiment wherein the SEFs are realized as a number of circumferential channels or grooves 34 formed in the interior surface of engine casing 24. Grooves 34 surround or circumscribe rotor 18(a) and are located radially outboard of the tips of the rotor blades 36 (one of which is partially shown in FIG. 2). The illustrated rotor blade 36 includes a leading edge (abbreviated as "LE" in FIG. 2), a trailing edge (abbreviated as "TE" in FIG. 2), and an outer tip located radially adjacent treated region 30 of engine casing 24. Grooves 34 can be continuous or interrupted. In further embodiments, a different groove configuration can be formed in region 30, such as axially-extending grooves or skewed grooves. A similar type of casing treatment can also be applied to region 32 shown in FIG. 1 and surrounding rotor 18(f). Alternatively, a different type of SEFs can be applied to region 30 and/or region 32.

Figure 3:
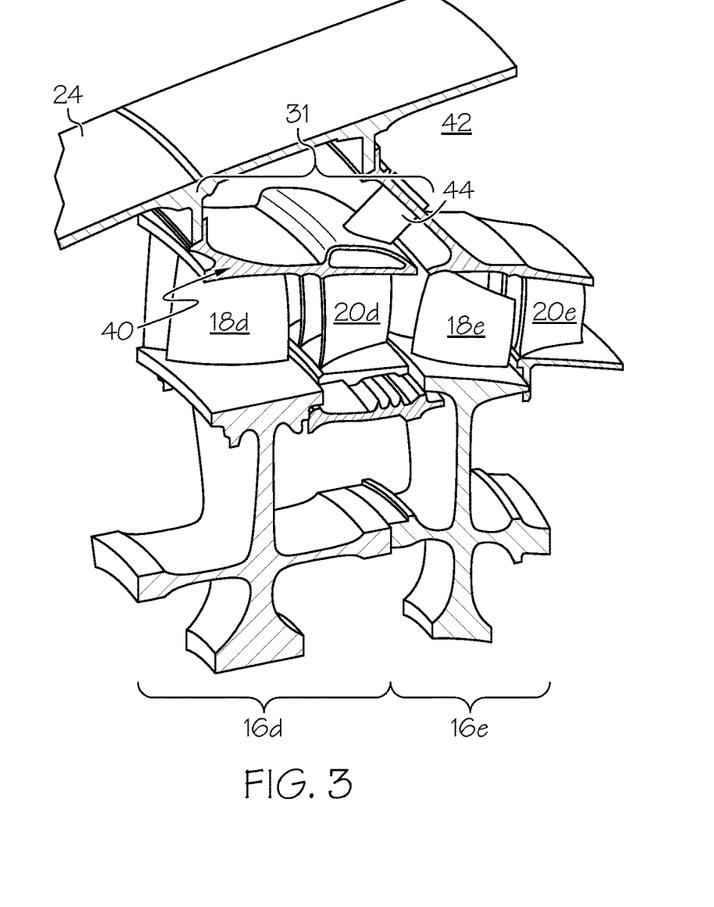
FIG. 3 is a detailed cross-sectional view of a second region of the multistage GTE compressor shown in FIG. 1 at which SEFs in the form of upstream injection features have been selectively applied.

FIG. 3 is an isometric cross-sectional view of a second, limited portion of multistage GTE compressor 10 to which SEFs have further been applied. Specifically, FIG. 3 illustrates region 31 of multistage axial compressor 10 in an implementation wherein the SEFs are realized as upstream injection features 40 (one of which can be seen). In this case, upstream injections feature 40 include a stator core duct 42 and in-bleed conduit 44, which injects a small percentage of bleed flow into stator 20(d) upstream of stall limiting rotor 18(e) during operation of compressor 10. In a preferred embodiment, the bleed in-flow is deflected to the tips of rotor 18(e) for improved surge margin. The bleed flow can be passive or controlled by a secondary flow system (not shown), which controls the rate of stator hub injection. In further embodiments, a different type of upstream injection may be integrated into region 31 of compressor 10.

The pressure ratios sustainable by multistage GTE compressor 10 are advantageously increased due to the presence of SEF-containing regions 30-32 integrated into compressor 10. Specifically, by applying SEF to selected regions 30-32 corresponding to stall limiting rotors 18(a), 18(e), and 18(f), the pressure ratio capability of multistage GTE compressor 10 is improved. At the same time, the addition of SEFs at locations corresponding to the rotors contained within intermediate compressor stages 16(b)-16(d) would be detrimental to compressor performance or would provide a limited performance benefit outweighed by added cost. In effect, the application of SEFs has been optimized in the case of multistage GTE compressor 10 (FIG. 1) such that performance gain is maximized, while production costs, the addition of weight, and other penalties are minimized. An exemplary process for optimizing compressor performance through the selective application of SEFs to a multistage GTE compressor, such as compressor 10, will now be described in conjunction with FIG. 4.

Figure 4:
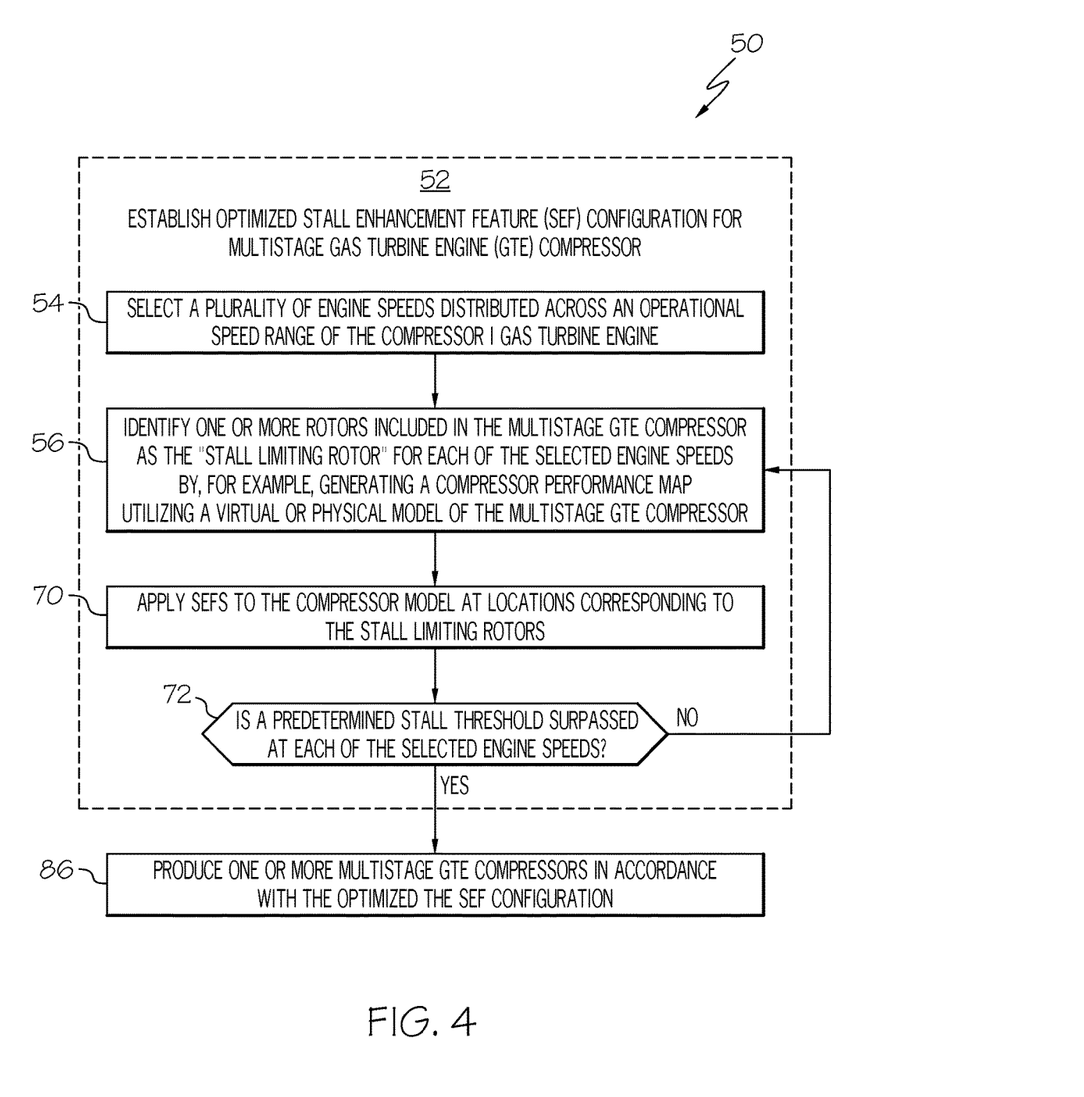
FIG. 4 is a flowchart setting-forth an exemplary method for optimizing GTE performance by selectively applying SEFs to a multistage GTE compressor, such as the multistage GTE compressor shown in FIG. 1.

FIG. 4 is a flowchart illustrating an exemplary method 50 for optimizing GTE compressor performance. Exemplary method 50 commences with the establishment of an optimized SEF configuration for a multistage GTE compressor, such as compressor 10 shown in FIG. 1 (PROCESS BLOCK 52). The SEFs configuration is "optimized" in the sense that SEFs are applied to selected regions of the multistage GTE compressor targeted to boost the stall margin capability of a specific subset of rotors identified as "stall limiting rotors." To establish the optimized SEF configuration (PROCESS BLOCK 52), a plurality of engine speeds is first selected (STEP 54, FIG. 4). The selected engine speeds are distributed across an operational range of the gas turbine engine containing the compressor section. The selected engine speeds range from a minimum engine speed to a maximum engine speed and may include any number of intermediate speeds between the minimum and maximum engine speeds. In an embodiment, the selected engine speeds may be separated by fixed intervals of 5% or 10% speed increments, wherein 100% is the engine speed at cruise. This example notwithstanding, the selected engine speeds need not occur at fixed internals in all embodiments. In certain instances, ground idle or start-up may be selected at the minimum engine speed, while the maximum selected engine speed may be equal to or greater than the maximum expected operational speed of the engine.

Figure 5:
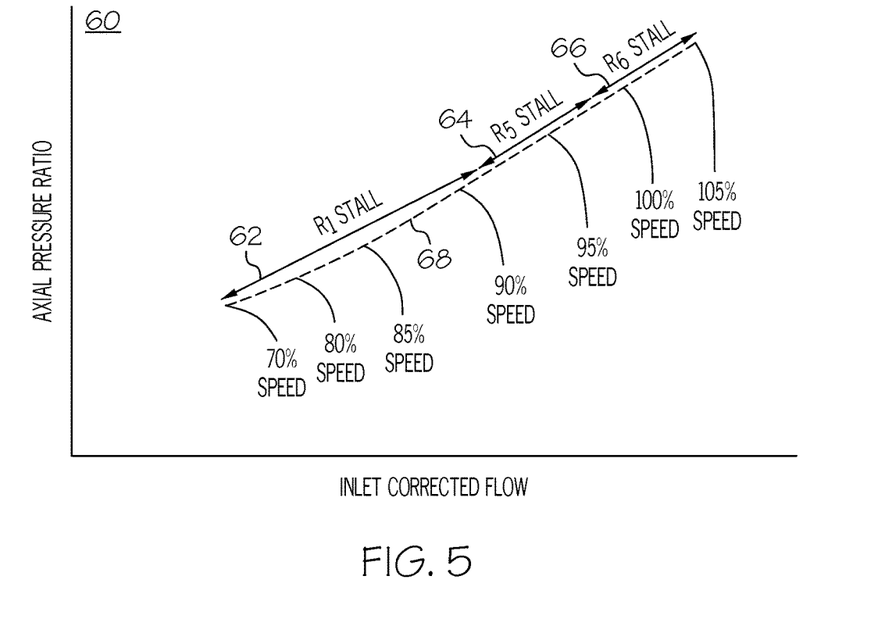
FIG. 5 is a compressor performance map that may be generated during the exemplary optimization method set-forth in FIG. 4 prior to the selective application of SEFs to a virtual or physical model of the multistage GTE compressor.

Advancing to STEP 56 of exemplary method 50 (FIG. 4), at least one axial compressor rotor is identified as the "stall limiting rotor" for each selected engine speed. As indicated above, the "stall limiting rotors" are the axial compressor rotors that set compressor stall at the selected engine speeds. As indicated in FIG. 4, the stall limiting rotors can be identified by generating a compressor performance map utilizing a model of the multistage GTE compressor. The compressor performance map can be a graph of axial pressure ratio (vertical axis) versus inlet corrected flow (horizontal axis) plotting the speed lines for the multistage GTE compressor at each of the selected engine speeds. The term "axial pressure ratio" refers to the ratio of outlet pressure over inlet pressure at each axial compressor stage, while the term "corrected flow" refers to the mass flow rate through the compressor stage corrected to standard day conditions. An example of such a compressor performance map 60 is illustrated in FIG. 5. In this particular example, compressor performance map 60 contains speed lines generated for the selected engine speeds of 70%, 80%, 85%, 90%, 95%, 100%, and 105% (wherein 100% is the engine speed at cruise). While these speed lines are shown on a single map for purposes of comparison, it will be appreciated that a different map may be generated for each speed line in actual implementations of method 50.

Compressor performance map 60 shown in FIG. 5 can be generated utilizing either a physical model or a virtual model of the multistage GTE compressor. When a physical model is utilized, the model can be operated at each selected engine speed, while the axial pressure ratio is gradually increased by, for example, modulating an exhaust valve supplying airflow to the model. The axial pressure ratio can be gradually increased at a given engine speed until compressor stall is reached, at which point the speed line corresponding to the tested engine speed terminates. Pressure measurements are taken during this process at each of the axial compressor rotors and possibly at other locations along the compressor. Any suitable measurement equipment can be utilized for this purpose including, but not limited to, high response equipment. The pressure measurements are then analyzed to determine which rotor or rotors set stall at the tested engine speed. This process is repeated at the other selected engine speeds to identify the stall limiting rotor for each of the selected engine speeds. A similar process is performed when a virtual model is utilized to generate compressor performance map 60. In this case, a specialized computer program can be utilized to analyze the virtual model of the multistage GTE compressor. The computer program is utilized to generate a speed line for each of the selected engine speeds as previously described. When stall is reached at a given one of the selected engine speeds, the data is analyzed to identify which rotor or rotors sets stall at the selected engine speed. In one embodiment, computational fluid dynamic analysis is utilized to identify the stall limiting stages by numerical instabilities; however, various other types of analysis can be utilized to identify the stall limiting stages in further embodiments.

The process described above can thus be utilized to identify a stall limiting rotor at each of the selected engine speeds. In keeping with the foregoing example, and as indicated in FIG. 5, rotor $R_1$ (corresponding to rotor 18(*a*) in FIG. 1) may be identified as the stall limiting rotor for engine speeds 70%, 80%, 85%, and 90% (indicated by double-headed arrow 62 in FIG. 5). Rotor $R_5$ (corresponding to rotor 18(*e*) in FIG. 1) may be identified as the stall limiting rotor for engine speed 95% (indicated by double-headed arrow 64 in FIG. 5). Finally, rotor $R_6$ (corresponding to rotor 18(*f*) in FIG. 1) may be identified as the stall limiting rotor for engine speeds 100% and 105% (indicated by double-headed arrow 66 in FIG. 5). As will be described more fully below, SEFs may consequently be applied to a model of compressor 10 at locations corresponding to rotors 18(*a*), 18(*e*), and 18(*f*), such as the locations identified in FIG. 1 by cross-hatched regions 30-32. As further indicated in FIG. 5, a stall line 68 can be extrapolated for the compressor model by connecting and extending the upper terminal ends of the speed lines includes in compressor performance map 60.

Turning next to STEP 70 of exemplary method 50 (FIG. 4), SEFs are next applied to the compressor model at locations corresponding to stall limiting rotors identified during STEP 56. In the case of a virtual compressor model, the SEFs can be applied analytically by utilizing the computer program to adjust the virtual model of the compressor. Alternatively, in the case of a physical compressor model, the SEFs can be physically added to or implemented into the compressor model. For example, in embodiments wherein a physical test model having non-treated removable casing sections is used, the casing sections surrounding the rotors of the stall limiting stages can be removed and replaced by treated casing sections; that is, casing sections having grooves or other casing treatment features formed therein. Additional computer analysis and/or additional flow testing can then be carried-out to answer the following query, which is presented at STEP 72 of exemplary method 50 (FIG. 4): "Is a predetermined stall threshold surpassed at each of the multiple engine speeds?" Specifically, in answering this query, a second or revised compressor performance map can be generated based upon the virtual or physical model after the SEFs have been applied to selected regions thereof. An example of such a revised compressor performance map that can be generated during STEP 72 (FIG. 4) is described below in conjunction with FIG. 6. The present example notwithstanding, it will be appreciated that an ideal stall threshold need not be achieved at each of the multiple engine speeds in all embodiments of method 50. Instead, in certain cases, the method may proceed to STEP 86 (production of a multistage GTE compressor including the optimized SEF configuration) when a minimal, acceptable level of stall margin is achieved at each of the multiple engine speeds.

Figure 6:
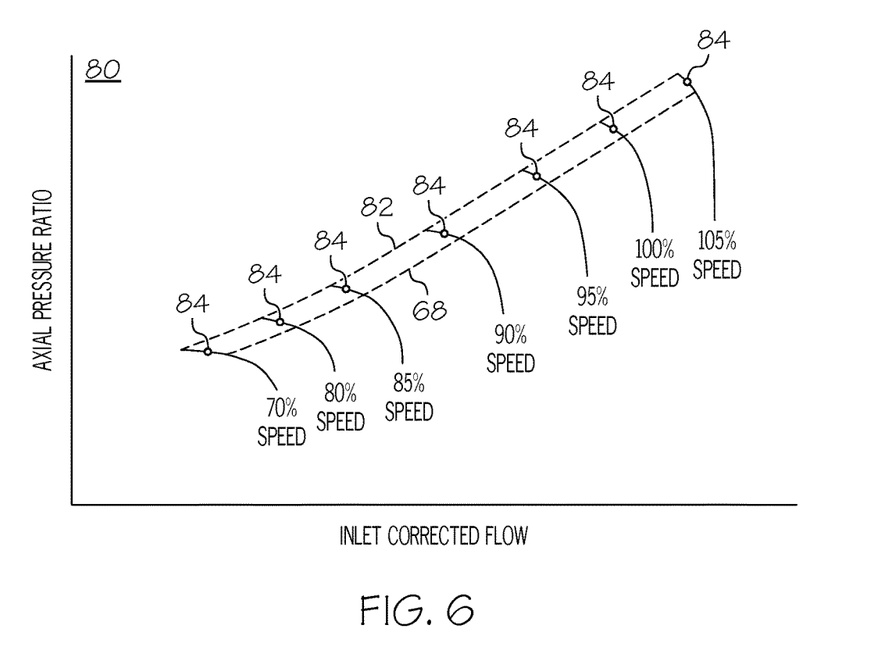
FIG. 6 is a compressor performance map that may be further generated during the exemplary optimization method set-forth in FIG. 4 after the selective application of SEFs to the compressor model.

FIG. 6 illustrates a revised compressor performance map 80 generated during STEP 72 of exemplary method 50 (FIG. 4). The improved stall line of the compressor model is represented by dashed line 82 connecting the upper terminal ends of stall lines, which have been extended by virtue of the selective addition of SEFs during STEP 70 (FIG. 4). As may be appreciated by comparing improved stall line 82 to the original stall line 68 (also shown in FIG. 6 for comparison purposes), the stall capability of the compressor model has improved across the entirety of the engine's operational speed range. Specifically, the speed line at each of the selected engine speeds now extends to a higher axial pressure ratio before stall is reached, as generally represented by the upper segments of the speed lines located between original stall line 68 and improved stall line 82. Also, at each of the selected engine speeds, a predetermined stall threshold (represented in FIG. 6 by markers 84) has now been surpassed. As a result, the inquiry posed at STEP 72 is answered in the affirmative, and PROCESS BLOCK 52 is completed with the establishment of an optimized SEF configuration. One or more multistage GTE compressor can now be produced to include the optimized SEF configuration (STEP 86), and method 50 concludes. Conversely, if the answer to the query posed at STEP 72 is "NO," method 50 returns to STEP 56 and the above-described steps of identifying the stall limiting rotors, applying SEFs to selected locations corresponding to the stall limiting rotors, and then retesting the compressor model are repeated. Finally, as noted above, the threshold for determining whether to advance to STEP 86 from decision STEP 72 can be based upon whether a minimal acceptable stall margin is achieved at each selected engine speed in alternative implementations of method 50.

The foregoing has thus provided methods for producing a multistage GTE compressor wherein compressor performance is optimized through the selective application of SEFs to a locations corresponding to a number of stall limiting rotors. By producing the compressor to include an optimized SEF configuration, the stall margin of the compressor can generally be maintained, while aerodynamic loading is favorably increased. As a result, the pressure ratios sustained during operation of the compressor can be increased to enhance overall GTE performance. In contrast to other known methods of boosting compressor ratios, the foregoing SEF optimization process avoids adding further stages to the compressor or increasing in the rotational speed over which the multistage GTE compressor operates. Furthermore, the selective application of SEFs to at locations corresponding to a selected subset of stall limiting rotors does not incur performance penalties that may otherwise result at certain compressor stages. Thus, by utilizing the foregoing method to identify selected compressor stages setting the operability limit across the operating range of the compressor, SEFs can be integrated into a minimum number of compressor stages, while maintaining the desired stall margin of the compressor across the entire operating range of the GTE.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for producing a multistage Gas Turbine Engine (GTE) compressor including a series of axial compressor stages each containing a rotor mounted to a shaft of a gas turbine engine, the method comprising:
    selecting a plurality of engine speeds distributed across an operational speed range of the gas turbine engine;
    identifying one or more stall limiting rotors at each of the selected engine speeds, the one or more stall limiting rotors identified based at least in part upon numerical instabilities generated by computational fluid dynamic analysis of a virtual model of the multistage GTE compressor;
    establishing an optimized stall enhancement feature (SEF) configuration in which SEFs are integrated into the multistage GTE compressor at selected locations corresponding to the stall limiting rotors; and
    producing the multistage GTE compressor in accordance with the optimized SEF configuration;
    wherein establishing comprises:
        after identifying one or more stall limiting rotors at each of the selected engine speeds, applying SEFs to the virtual model of the multistage GTE compressor at the selected locations;
        re-testing the virtual model to determine if a predetermined stall threshold is surpassed at each of the selected engine speeds;
        if the predetermined stall threshold is surpassed at each of the selected engine speeds, utilizing the locations at which the SEFs have been applied to the virtual model to establish the optimized SEF configuration; and
        if the predetermined stall threshold is not surpassed at each of the selected engine speeds, repeating the steps of applying and retesting.

2. The method of claim 1 wherein identifying comprises:
    plotting a speed line for each of the selected engine speeds on a compressor performance map, while increasing the axial pressure ratio applied across the virtual model of the multistage GTE compressor until stall is reached; and
    after reaching stall at each of the selected engine speeds, utilizing data gathered from the virtual model to determine which of the rotors contained within the series of axial compressor stages is the stall limiting rotor for each of the selected engine speeds.

3. The method of claim 1 wherein the SEFs comprise casing treatment features, and wherein the casing treatment features are positioned around at least one of the stall limiting rotors in the optimized SEF configuration.

4. The method of claim 3 wherein the casing treatment features comprise grooves formed in an engine casing and circumscribing at least one of the stall limiting rotors in the optimized SEF configuration.

5. The method of claim 1 wherein the SEFs comprise upstream injection features, and wherein the upstream injection features are positioned upstream of at least one of the stall limiting rotors within a flow field thereof.

6. The method of claim 5 wherein the upstream injection features comprise stator hub flow injection features.

7. The method of claim 1 wherein establishing comprises establishing the optimized SEF configuration to include a first type of stall enhancing feature disposed at a location corresponding to a first stall limiting rotor and to include a second, different type of stall enhancing feature disposed at location corresponding to a second stall limiting rotor.

8. The method of claim 7 wherein the first stall limiting rotor comprises the leading rotor in the multistage GTE compressor.

9. The method of claim 8 wherein the first type of stall enhancing feature comprises casing treatment features disposed at a location circumscribing the leading rotor.

10. A method for producing a multistage Gas Turbine Engine (GTE) compressor including a series of axial compressor stages each containing a rotor mounted to a shaft of a gas turbine engine, the method comprising:
    selecting a plurality of engine speeds distributed across an operational speed range of the gas turbine engine;
    identifying one or more stall limiting rotors at each of the selected engine speeds utilizing a physical model of the multistage GTE compressor having non-treated removable casing sections;
    establishing an optimized stall enhancement feature (SEF) configuration in which SEFs are integrated into the multistage GTE compressor at selected locations corresponding to the stall limiting rotors; and producing the multistage GTE compressor in accordance with the optimized SEF configuration;

wherein establishing comprises:

after identifying one or more stall limiting rotors at each of the selected engine speeds, applying SEFs to the physical model at selected locations corresponding to the stall limiting rotors by replacing corresponding ones of the non-treated casing sections with treated casing sections;

after applying SEFs to the physical model, re-testing the model to determine if a predetermined stall threshold is surpassed at each of the selected engine speeds;

if the predetermined stall threshold is surpassed at each of the selected engine speeds, utilizing the locations at which the SEFs have been applied to the model to establish the optimized SEF configuration; and if the predetermined stall threshold is not surpassed at each of the selected engine speeds, repeating the steps of applying and retesting.

11. The method of claim 10 wherein identifying comprises:

plotting a speed line for each of the selected engine speeds on a compressor performance map, while increasing the axial pressure ratio applied across the physical model of the multistage GTE compressor until stall is reached; and after reaching stall at each of the selected engine speeds, utilizing data gathered from the physical model to determine which of the rotors contained within the series of axial compressor stages is the stall limiting rotor for each of the selected engine speeds.

12. The method of claim 10 wherein the SEFs comprise grooves formed in an engine casing and circumscribing at least one of the stall limiting rotors in the optimized SEF configuration.

13. The method of claim 10 wherein the SEFs comprise upstream injection features, and wherein the upstream injection features are positioned upstream of at least one of the stall limiting rotors within a flow field thereof.

14. The method of claim 10 wherein establishing comprises establishing the optimized SEF configuration to include a first type of stall enhancing feature disposed at a location corresponding to a first stall limiting rotor and to include a second, different type of stall enhancing feature disposed at location corresponding to a second stall limiting rotor.

15. The method of claim 14 wherein the first stall limiting rotor comprises an upstream rotor and a plurality of additional rotors downstream of the upstream rotor, and wherein the first type of stall enhancing feature comprises casing treatment features disposed at a location circumscribing the upstream rotor.

\* \* \* \* \*